US011816732B1

(12) United States Patent
Melachrinos et al.

(10) Patent No.: US 11,816,732 B1
(45) Date of Patent: Nov. 14, 2023

(54) GENERATION OF LIVE MARKET DATA FOR DECENTRALIZED SYSTEMS FROM TRANSACTION DATA EXTRACTED FROM A BLOCKCHAIN

(71) Applicant: Challenger Deep SAS, Paris (FR)

(72) Inventors: Anastasia Melachrinos, Paris (FR); Alexander Coenegrachts, Paris (FR)

(73) Assignee: Challenger Deep SAS, Paris (FR)

( * ) Notice: Subject to any disclaimer, the term of this patent is extended or adjusted under 35 U.S.C. 154(b) by 0 days.

(21) Appl. No.: 18/127,648

(22) Filed: Mar. 28, 2023

(30) Foreign Application Priority Data

May 2, 2022 (EP) .................................... 22290022

(51) Int. Cl.
*G06Q 40/04* (2012.01)
*G06Q 20/38* (2012.01)

(52) U.S. Cl.
CPC ........... *G06Q 40/04* (2013.01); *G06Q 20/389* (2013.01)

(58) Field of Classification Search
CPC ............................ G06Q 40/04; G06Q 20/389
See application file for complete search history.

(56) References Cited

U.S. PATENT DOCUMENTS

2022/0301092 A1* 9/2022 Groswirt ............ G06Q 20/0655
2023/0141423 A1* 5/2023 Fantini ................ G06Q 20/367
705/37

FOREIGN PATENT DOCUMENTS

JP           7209984 B1 *  1/2023  ............. G06Q 20/06
WO    WO-2020027408 A1 *  2/2020  ........... G06Q 20/065
WO    WO-2022212801 A2 * 10/2022  ........... G06Q 20/065

OTHER PUBLICATIONS

Yu, Song: Application of Blockchain-based Sports Health Data Collection System in the Development of Sports Industry, 2021, Hindawi, pp. 1-14 (Year: 2021).*
CoinEx: CoinEx Chain, Jine 13, 2019, White Paper, pp. 1-33 (Year: 2019).*
1inch Network: "1 inch Network—Spot Price Aggregator," https://github.com1inch, Apr. 12, 2022, pp. 106, XP055960765, https://github.com/1inch/spot-price-aggregator/tree/4cd6569b67fae4a33a7848a7e2b7f178b860e345, retrieved Sep. 14, 2022.

(Continued)

*Primary Examiner* — Bijendra K Shrestha
(74) *Attorney, Agent, or Firm* — Norton Rose Fulbright US LLP

(57) ABSTRACT

Methods and systems for providing mechanisms for generating live market data for decentralized exchanges (DEXs) from transaction data extracted from a blockchain are provided. In embodiments, blockchain data associated with at least one token is obtained from a blockchain. The blockchain data corresponds to at least one executed function of a DEX protocol associated with the at least one token. Transaction data associated with the at least one executed function using at least one model generated based on an implementation of the DEX protocol is extracted from the blockchain data corresponding to the at least one executed function. The extracted transaction data is structured into a standardized format for market data corresponding to the at least one executed function associated with the at least one token, and the market data for the at least one token is outputted via one or more off-chain distribution channels.

20 Claims, 6 Drawing Sheets

(56) References Cited

OTHER PUBLICATIONS

Etherscan.lo: "DEX Tracker | Etherscan", Apr. 5, 2022, pp. 1-2, XP055960798, https://web.archive.org/web/20220405034034/https://etherscan.io/dex, retrieved Sep. 14, 2022.
Search Report and Written Opinion, European Patent Application No. 22290022.7, dated Sep. 22, 2022, 8 pages.

* cited by examiner

FIG. 2B

GENERATION OF LIVE MARKET DATA FOR DECENTRALIZED SYSTEMS FROM TRANSACTION DATA EXTRACTED FROM A BLOCKCHAIN

CROSS-REFERENCE TO RELATED APPLICATIONS

The present application claims the benefit of priority from European patent application no. EP 22 290 022.7, filed May 2, 2022 and entitled "GENERATION OF LIVE MARKET DATA FOR DECENTRALIZED SYSTEMS FROM TRANSACTION DATA EXTRACTED FROM A BLOCKCHAIN," the disclosure of which is incorporated by reference herein in its entirety.

TECHNICAL FIELD

The present invention relates generally to decentralized data processing, and more particularly to mechanisms for generation of live market data for decentralized systems from transaction data extracted from a blockchain.

BACKGROUND OF THE INVENTION

Decentralized exchanges (DEXs) are peer-to-peer networks where traders make transactions directly without relinquishing management of their assets to an intermediary or custodian, as is done in centralized exchanges (CEXs). In CEXs, a customer's assets may be deposited and held by a CEX. In DEXs, users are allowed to trade directly from their wallets by interacting with the smart contracts behind the DEX. Typically, DEXs may be built on top of blockchain networks that support smart contracts. One or more smart contracts may be used to implement the DEX and to manage and control transactions. In this sense, a DEX protocol may be defined by these smart contracts. During operations, traders interact directly with the smart contracts on the blockchain to use DEXs. DEXs provide what CEXs haven't been able to offer: users having full control over their assets thanks to protocols built upon trusted blockchains.

In CEXs, once a CEX's matching engine has executed an order, the order may become a trade. However, to ensure the settlement of the transaction associated with the trade in the blockchain, the trader has to trust the CEX. Centralized trading platforms operate off-chain, which means that they act as custodians for their clients and transactions are not recorded on-chain. In such off-chain order book models, the CEX holds users' tokens during the whole transaction and even after the transaction settlement. In some cases, assets may be held offline in hardware cold storage wallets, or online in so called hot wallets. However, such an approach creates a significant security vulnerability, as CEXs typically operate with a single point of failure (which imply a high counterparty risk), whether it's a central database, wallet, or server, and that means a single hack could result in the loss of a significant amount of assets.

As noted above, in a DEX, transaction settlement happens directly on-chain. In this manner, a DEX does not act as a custodian of the user's tokens, but rather the user holds his or her tokens. DEXs address the problems of centralized structures by building peer-to-peer markets directly on the blockchain, allowing traders to remain custodians of their funds. In this manner, DEXs take advantage of the security and possibilities provided by smart chains and decentralization, to facilitate the exchange of assets. Smart contracts are used to match, execute, and settle trades and transactions. Practically, on DEXs, smart contracts hold liquidity reserves of various tokens into so-called liquidity pools, and trades are settled directly against these reserves.

However, as DEXs are implemented directly on the blockchain, DEX protocols may make use of a multi-layer architecture that is founded on a blockchain protocol (e.g., Ethereum). Each of the layers of the DEX protocol model may be built on top of one another, resulting in a transparent and highly composable architecture that allows anybody to build on or make use of other components of the stack. It is here that different DEXs may be implemented using different protocols/smart contracts. Many DEXs have been implemented, and oftentimes the smart contracts behind those protocols are compatible and deployed on several chains and/or different layers in order to capture a wide range of users, each network infrastructure having a different offering in terms of protocols, security, and transaction costs. In addition, DEX transactions (e.g., swaps, mints, burns, etc.) may be implemented differently in different DEXs using different protocols. The implementation of these DEX functions may be defined or managed by the smart contracts implementing the different DEXs.

Although providing very powerful and varied offerings for implementing a DEX, and despite the flexibility in which a DEX may be deployed, each DEX may be implemented with a different protocol or smart contract, which creates a significant challenge for generating market data associated with transactions executed in the various DEXs. Although the nature of DEX implementations provides a unique opportunity to provide 100% transparent market data because DEX transaction settlement is realized directly on-chain, the nature of DEX technical implementation presents an unprecedented challenge in order to properly collect or extract this data directly from the blockchain(s) and deliver it off-chain, in a timely, standardized, and normalized manner. As each DEX may use a different protocol, obtaining meaningful data from the different DEXs is practically impossible. For example, providing historical tick-level data for a particular asset pair for different DEXs is an extremely difficult task as it may require analyzing and understanding the many different protocols and how each protocol implements the different protocol functions. In addition, some DEXs provide an application programming interface (API) for obtaining data, but oftentimes the data provided may be incomplete and/or inaccurate. Furthermore, providing real-time market data (e.g., real-time asset price data) for assets on the various DEXs is currently not supported, as an on-chain transaction settlement means that there is a latency associated with the transaction settlement on the blockchain, such as due to consensus building before a block containing the transaction may be finalized to the blockchain. This latency of the consensus network prevents presentation of live market data, such as tick-level data.

BRIEF SUMMARY OF THE INVENTION

Aspects of the present disclosure provide systems, methods, and computer-readable storage media that support mechanisms for generation of live market data for decentralized systems from transaction data extracted from a blockchain. In aspects, the techniques disclosed herein may enable a system to provide off-chain delivery of market data across multiple DEXs from on-chain data for DEX blockchain transactions. The systems and techniques of embodiments provide improved systems with capabilities to generate and provide market data in a standardized format for a plurality of DEXs that may implement different DEX protocols. The market data may be associated with various assets (e.g., asset pairs) hosted in the various DEXs. In aspects, the standardized format for providing the market data may include a trade format that includes volume, price, direction of trade (e.g., buy or sell), trade ID, and/or a trade timestamp. The standard trade format may also be applied to market data for assets hosted in a CEX. In this manner, embodiments of the present disclosure allow a system to provide a single endpoint (e.g., graphical user interface (GUI), application programming interface (API)) that may be configured to provide market data for assets of CEXs and/or DEXs, as may be requested by a user.

In some aspects, systems implemented in accordance with the present disclosure may be enabled to provide real-time or live off-chain market data on assets hosted in a DEX. For example, one or more nodes may be deployed to collect live blockchain transaction data. In aspects, the one or more nodes may include collection nodes that may particulate in block validation and/or consensus building and may include functionality to collect transaction blocks (e.g., transaction blocks including transaction data) during validation and/or consensus building operations. The live blockchain transaction data may correspond to different protocol functions executed in one or more DEXs (e.g., one or more of a swap, a mint, and a burn). In aspects, the blockchain data associated with a transaction may be analyzed and processed as consensus is being built. Prior to the blockchain transaction data being finalized (e.g., based on a threshold indicating that a threshold consensus has been reached and before the blockchain transaction is settled on the blockchain, or based on a parameter in the transaction data indicating that the associated block is finalized), a system in accordance with aspects may collect the associated blocks and may extract transaction data (e.g., data corresponding to the underlying protocol function executing the transaction) from the blocks, may use the extracted transaction data to generate standard formatted market data using a model generated based on the protocol implementing the DEX hosting the asset associated with the transaction, and may distribute the standard formatted market data off-chain to a user. In an aspect, the transaction data may be extracted from finalized blocks. For example, latency is introduced on the Ethereum Blockchain under the Proof of Work (PoW) consensus due to "blocks reorganization." The system may mitigate the impact of this latency by utilizing a parameter to control when the system extracts data from the finalized blocks, where the parameter may be configured to account for the latency associated with the "blocks reorganization" process.

In aspects, the model generated based on the protocol implementing the DEX hosting the asset may represent a set of rules, agreements, standards, guidelines, etc. associated with the protocol. In aspects, such a model may be generated based on an in-depth analysis of the DEX protocol or smart contracts implementing the DEX protocol to identify the structure of the protocol function configured to execute the transaction. In aspects, the models for the various DEX protocols may be generated manually based on an understanding of the methods and specificities of each protocol. In additional or alternative aspects, the models may be generated automatically (e.g., via analysis using machine learning techniques).

In one particular embodiment, a method of generating standardized market data for decentralized systems is provided. The method includes obtaining, by at least one blockchain collection node, blockchain data associated with at least one token from a blockchain. In aspects, the blockchain data corresponds to at least one executed function of a DEX protocol associated with the at least one token. The method also includes extracting from the blockchain data corresponding to the at least one executed function, transaction data associated with the at least one executed function using at least one model generated based on an implementation of the DEX protocol, structuring the extracted transaction data into a standardized format for market data corresponding to the at least one executed function associated with the at least one token, and outputting the market data for the at least one token via one or more off-chain distribution channels or on-chain distribution channels.

In another embodiment, a system for generating standardized market data for decentralized systems is provided. The system includes at least one blockchain collection node configured to collect blockchain data associated with one or more tokens from one or more blockchains. In aspects, the blockchain data corresponds to one or more executed protocol functions associated with the one or more tokens, and two or more of the at least one DEX are implemented using a different protocol. The system also includes a data processing engine configured to extract, from the blockchain data corresponding to the one or more executed protocol functions, transaction data associated with the one or more executed protocol functions using one or more models generated based on one or more of the different protocols implementing the at least one DEX, ad structure the extracted transaction data into a standardized format for market data corresponding to the one or more executed protocol functions associated with the one or more tokens. The system also includes an output generator configured to output the market data for the at least one token via one or more off-chain distribution channels.

In yet another embodiment, a computer-based tool for generating standardized market data for decentralized systems may be provided. The computer-based tool may include non-transitory computer readable media having stored thereon computer code which, when executed by a processor, causes a computing device to perform operations that include obtaining, by at least one blockchain collection node, blockchain data associated with at least one token from a blockchain. In aspects, the blockchain data corresponds to at least one executed function of a DEX protocol associated with the at least one token. The operations also include extracting from the blockchain data corresponding to the at least one executed function, transaction data associated with the at least one executed function using at least one model generated based on an implementation of the DEX protocol, structuring the extracted transaction data into a standardized format for market data corresponding to the at least one executed function associated with the at least one token, and outputting the market data for the at least one token via one or more off-chain distribution channels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2B shows a screenshot of a swap transaction executed using a DEX aggregator protocol and illustrating exemplary types of information that may be extracted or identified in accordance with embodiments of the present disclosure.

Figure 1:
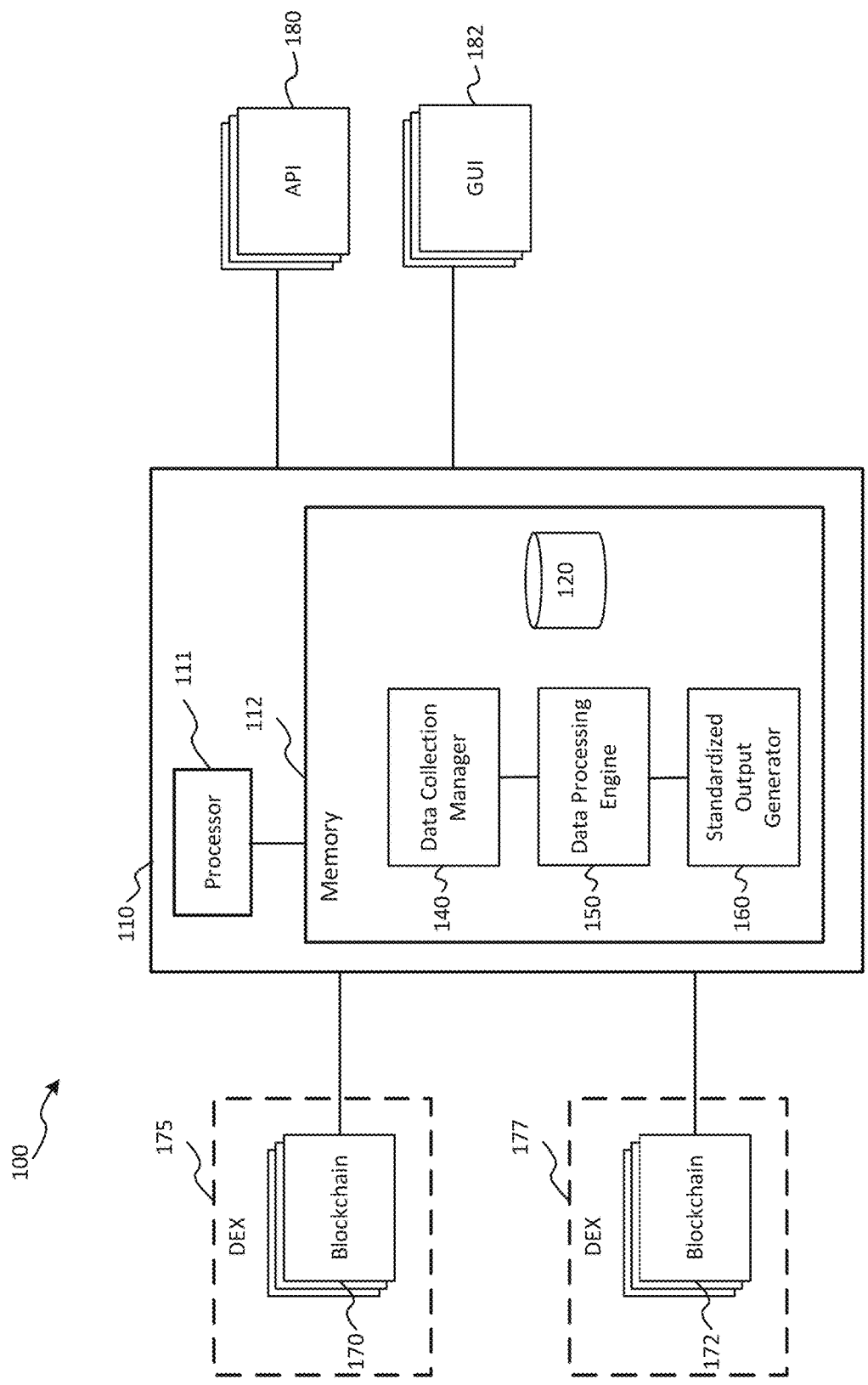
FIG. 1 is a block diagram of an exemplary system 100 configured with capabilities and functionality for providing mechanisms for generating live market data for decentralized exchanges (DEXs) from transaction data extracted from a blockchain in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Various aspects of the present disclosure provide systems, methods, and computer-readable storage media that support mechanisms for generation of live market data for decentralized exchanges (DEXs) from transaction data extracted from a blockchain. As noted throughout the present application, the techniques disclosed herein configure a system with capabilities to generate and provide market data in a standardized format for a plurality of DEXs that may be implemented using different protocols. The market data may be associated with various assets (e.g., asset pairs) hosted in the various DEXs. In aspects, the standardized format for providing the market data may include a trade format that includes volume, price, direction of trade (e.g., buy or sell), trade ID, and/or a trade timestamp. The standard trade format may also be applied to market data for assets hosted in a centralized exchange (CEX). In this manner, embodiments of the present disclosure allow a system to provide a single endpoint (e.g., graphical user interface (GUI), application programming interface (API)) that may be configured to provide market data for assets of CEXs and/or DEXs, as may be requested by a user.

Additionally, the techniques disclosed herein enable a system to provide off-chain live market data on assets hosted in a DEX. For example, one or more nodes may be deployed to collect live blockchain transaction data. In aspects, the one or more nodes may include collection nodes that may participate in block validation and/or consensus building and may include functionality to collect transaction blocks (e.g., transaction blocks including transaction data) during validation and/or consensus building operations. The live blockchain transaction data may correspond to different protocol functions executed in one or more DEXs (e.g., one or more of a swap, a mint, and a burn). In aspects, the blockchain data associated with a transaction may be analyzed and processed as consensus is being built. Prior to the blockchain transaction data being finalized (e.g., based on a threshold indicating that a threshold consensus has been reached and before the blockchain transaction is settled on the blockchain, or based on a parameter in the transaction data indicating that the associated block is finalized), a system in accordance with aspects may collect the associated blocks and may extract transaction data (e.g., data corresponding to the underlying protocol function executing the transaction) from the blocks.

In an additional or alternative aspect, the transaction data may be extracted from finalized blocks. For example, latency is introduced on the Ethereum Blockchain when operating under the PoW consensus due to a process called "blocks reorganization." To illustrate, in a PoW consensus, such as that of the Ethereum blockchain, miners attempt to find valid blocks and record them to the blockchain (e.g., as a new block). Since there are many miners it may take time for a valid block to propagate across the network of miners and determine which miner found the valid block. As the results of validation propagate through the network blocks may be reorganized (e.g., a first miner may find a valid block and a second miner may subsequently find a valid and the network must reconcile which miner's block should be the final block recorded to the blockchain (i.e., reach consensus)). To ensure the data is extracted as quickly as possible the system may include a parameter configured to control extraction or reading of data from finalized blocks as early as possible without risking reorganization. To illustrate, suppose the blocks reorganization process is final with respect to a particular block after 10 blocks (i.e., all blocks 10 blocks prior to a last block added to the blockchain). In such an instance the parameter may be configured to cause the system to extract data from the first finalized block of the blockchain, which may be expressed as E=read.block(L−x), where E is the extracted data, x is the parameter, read.block( ) is a function for reading/extracting data from a block, and L is the address of the last block added to the blockchain. In this manner, the system is able to extract data from a block immediately upon the block becoming final (i.e., no longer subject to potential changes due to "blocks reorganization"), thereby enabling the information to be extracted and distributed in real time (or near-real time) and ensuring that the distribution of the data is accurate. It is noted that the parameter may be configured to include multiple values to support extraction of data from different blockchains that may have different "blocks reorganization" latencies. To illustrate, as a result of "blocks reorganization"-type processes a first blockchain may have a latency of 10 blocks before a block can be considered "finalized" and a second blockchain may have a latency of 5 blocks. In such instances the parameter may include a first value (e.g., 10) for the first blockchain and a second value (e.g., 5) for the second blockchain, thereby enabling efficient extraction of data from "finalized" blocks of the first and second blockchains and distribution of data derived from the different blockchains. In addition to increasing the speed at which the data may be extracted and distributed, the parameter also improves the transparency and repeatability of the system (e.g., since all data is extracted from or derived from blocks in their final and immutable form).

Once data extraction is complete, the system may use the extracted transaction data to generate standard formatted market data using a model generated based on the protocol implementing the DEX hosting the asset associated with the transaction, and may distribute the standard formatted market data off-chain to a user. In aspects, the model generated based on the protocol implementing the DEX hosting the asset may represent a set of rules, agreements, standards, guidelines, etc. associated with the protocol. In aspects, such a model may be generated based on an in-depth analysis of the DEX protocol or smart contracts implementing the DEX protocol to identify the structure of the protocol function configured to execute the transaction. In aspects, the models for the various DEX protocols may be generated manually or may be generated based on an understanding of the methods and specificities of each protocol. In additional or alternative aspects, the models may be generated automatically (e.g., via analysis of the protocols and associated methods and data using machine learning techniques).

The result of the implementation of aspects disclosed herein is a system that provides additional features and is more efficient, accurate, and faster than a system implemented without the techniques disclosed herein. Thus, it should be appreciated that the techniques and systems disclosed herein provide a technical solution to technical problems existing in the industry practice of blockchain-based decentralized systems. Furthermore, the techniques and systems disclosed herein embody a distinct process and a particular implementation that provide an improvement to existing computer systems by providing the computer systems with new capabilities and functionality for generating live market data for DEXs from transaction data extracted from a blockchain, such as live market data associated with one or more tokens or token pairs. It is noted that as used herein, the term "token" may mean any blockchain-based assets, which may include non-fungible tokens (NFTs) and fungible tokens. Furthermore, it should be understood that the concepts described herein may be applied across many different blockchains, each supporting one or more types of tokens. For example, the Ethereum blockchain supports many different token standards, such as ERC-20 related to fungible (interchangeable) tokens, ERC-721 related to NFTs and supporting use cases for showing ownership of an asset, and the like, while other blockchains may support tokens associated with other token standards. Thus, it should be appreciated that the concepts disclosed herein could readily be applied to many different blockchains and support generation of live market data for one or more of the tokens supported by those blockchains depending on the particular configuration of the system.

FIG. 1 is a block diagram of an exemplary system 100 configured with capabilities and functionality for providing mechanisms for generating live market data for decentralized systems from transaction data extracted from a blockchain in accordance with embodiments of the present disclosure. As shown in FIG. 1, system 100 includes server 110 configured to include various components for providing various aspects of the functionality described herein. In aspects, the functionalities described with reference to each of the different functional blocks of system 100 may be provided via computing resources disposed in a cloud-based environment. For example, in some embodiments, server 110 may be implemented, wholly or in part, as an on-site server, or as a cloud-based system.

In aspects, server 110 may be or may include one or more nodes configured to interface and/or communicatively connect with at least one blockchain network to collect transaction data from the blockchain related to trade events on one or more DEXs. For example, DEX 175 may operate to provide a decentralized asset (or token) trading platform to users. DEX 175 may host one or more tokens available for trading by users, and may be implemented directly on blockchain 170. DEX 175 may be implemented using a layered approach with a blockchain protocol as a foundational or first layer (e.g., a settlement layer). Every layer of the layered approach may have a purpose (e.g., network infrastructure, tokens, protocols, applications, aggregations etc.). On top of the first layer, a second layer (e.g., an asset layer) may be used to define standards used to create tokenized assets (e.g., as tangible assets or non-fungible tokens (NFTs)). On top of the second layer, a third layer (e.g., the protocol layer) may be used to define utility-oriented protocols such as DEXs, lending and borrowing protocols, derivatives protocols, etc. A fourth layer (e.g., the application layer) may be dedicated to user interfaces that make DEX protocols/smart contracts usable by a large number of users. A fifth layer (e.g., the aggregation layer) builds user-centric systems with connections to a variety of protocols or applications. Currently, the Ethereum blockchain is the most widely used for DEXs (e.g., the Ethereum blockchain represents the chain which concentrates most liquidity dedicated to decentralized finance (DeFI) systems). Typically, DEX protocols may be built upon the first or second layer. In some implementations, the smart contracts behind DEX protocols may be compatible and deployed on several blockchains and/or the second layer, in order to capture a wide range of users, each network infrastructure having a different offering in terms of protocols, security, and transaction costs. In some aspects, DEX protocols may be implemented on other layers or on any combination of the layers of the DEX layered model.

Blockchain 170 may be any kind of distributed ledger platform, although most DEXs are implemented on a single blockchain (e.g., the Ethereum blockchain). Any transaction (e.g., trade transaction or liquidity-related transaction) performed within DEX 175 may be settled to blockchain 170. For example, a transaction executed within DEX 175 may generate transaction blocks that may be finalized and settled onto blockchain 170. In this sense, a blockchain associated with a DEX may include (e.g., in the blocks of the blockchain) blocks including transaction data associated with transactions performed within the DEX.

The overall implementation of DEX 175 may be managed by one or more smart contracts defining a protocol that is to be used to manage transactions within DEX 175. For example, the one or more smart contracts may define various protocol functions (e.g., swap, mint, burn, etc.) that may be configured to enable transactions (e.g., token trading) to be executed within DEX 175. These smart contracts may be used to match, execute, and settle trades and transactions to blockchain 170. From a practical standpoint, smart contracts hold liquidity reserves of various tokens in a DEX into liquidity pools, and transactions (e.g., trades or swaps) are settled directly against these liquidity pools, rather than against a counterparty's assets.

Liquidity pools in DEXs are user-provided (disintermediated), and access to these liquidity pools may be governed by the DEX protocol implementation (e.g., DEX smart contracts). Liquidity providers add liquidity to the liquidity pools by committing proportional quantities of tokens to form the equivalent of a trading pair. Smart contracts hold and manage liquidity reserves according to real-time supply and demand in a pool of tokens but also to the underlying price deterministic algorithm. Asset prices in a DEX do not depend on any external flow, so in some cases it may be necessary to wait for arbitrage operations to obtain a price similar to that of other market places. Traders (e.g., executing a swap) may use the liquidity available in the liquidity pools of a trading pair, and may swap between the tokens of the trading pair. For example, a trader may trade directly against the smart contract implementing the DEX. The smart contract configuring the DEX protocol may execute protocol functions to retrieve the asset to be exchanged from the seller and to send the asset to be bought by the buyer at the current exchange rate.

It is noted that most DEX implementations use automated market making (AMM) to provide users with liquidity to trade. AMMs use conservation functions to price assets algorithmically by letting the price move based on supply and demand of those assets, unlike order-book-based exchanges where the market price of an asset is decided by the last matched buy and sell orders. With AMMs on decentralized exchanges, it is no longer necessary to have a counterparty (another trader) to make a trade. Instead, each user interacts with a smart contract that "makes the market" for them. In this case, prices are formed based on demand and supply, with the market makers' mandate being solely to provide liquidity to the liquidity pools. As such, obtaining a market price for a particular asset in current implementations of DEXs is a very difficult task, but obtaining a real-time market price is currently impossible in current systems.

In aspects, server 110 may be configured to interface and/or communicatively connect with more than one DEX. For example, as shown in FIG. 1, server 110 may communicatively connect with DEX 177, which may operate to provide a decentralized asset (or token) trading platform to users. In aspects, DEX 177 may be implemented using a different protocol than the protocol of DEX 175, and/or may be implemented on blockchain 172 (which may be the same as blockchain 170 or may be a different blockchain). For example, protocol functions implemented in DEX 177 may be different than the protocol functions implemented in DEX 175. As noted above, this difference creates significant challenges when attempting to obtain and integrate, off-chain, market data from the on-chain transactions executed within the various DEXs. However, as described herein, embodiments of the present disclosure provide techniques and systems that provide a solution to address the challenges arising from the disparity between the various DEX protocols.

As noted above, server 110 may be configured to provide mechanisms for standardizing off-chain delivery of market data across multiple DEXs from on-chain data for DEX blockchain transactions in accordance with embodiments of the present disclosure. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure.

It is further noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

As shown in FIG. 1, server 110 includes processor 111 and memory 112. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

System 100 may include one or more off-chain distribution channels, such as API 180 and/or GUI 182. In aspects, API 180 may be configured to allow users to request, via functions provided in API 180, the market data generated by system 100. API 180 may define various functions for requesting data, which data is requested, and how the data is to be delivered to the user. In this manner, API 180 may provide a user an entry point into all the functionality of system 100 as described herein. In aspects, GUI 182 may be configured to display the standardize market data generated by system 100. In aspects, a user may specify configurations on how the market data is to be presented, including which DEXs market data is to be displayed for, individual assets market data, and in some cases even which CEXs market data is to be displayed for. In aspects, GUI 182 may be a GUI provided by system 100 or may be an external GUI provided by a third party who obtains the market data from system 100.

As shown in FIG. 1, memory 112 includes data collection manager 140, data processing engine 150, and standardized output generator 160. Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 120 for storing various information related to operations of system 100. For example, database 120 may store blockchain data collected from DEX 175 and/or DEX 177, including transaction data, as well as implementation details on the DEX protocols/smart contract. For example, models may be generated based on analysis of the various DEX protocols to identify the technical implementation details of the various DEX protocols. These models may represent an understanding and mastery of the various DEX protocols and how the various DEX protocols operate to enable and execute transactions. For example, the models may include technical details on how the various DEX protocols implement the various protocol functions, and may enable server 110 to collect on-chain transaction data from the blockchain, to analyze the collected data to extract relevant market data, to generate a standard formatted output including the market data, and to provide the standardized market data via one or more off-chain distributions channels.

Data collection manager 140 may be configured to collect blockchain data, including smart contract information and/or transaction data. For example, data collection manager 140 may collect information from the smart contract(s) implementing the DEXs for which market data is to be generated. For example, as shown in FIG. 1, data collection manager 140 may be configured to collect smart contract information for DEX 175 and DEX 177. In aspects, the smart contract data may include information that is not related to transactions specifically, but that it is related to the DEX implementation.

In aspects, transaction data collected by data collection manager 140 may include historical and live data from the blockchain blocks upon which any DEX is implemented. In aspects, the transaction data may include the on-chain finalized block associated with the transactions executed in the DEXs implemented on the blockchain. As will be discussed in the following, data collection manager 140 may be configured to collect transaction data registered on a blockchain for various DEXs implemented using different and disparate protocols. As such, the collected on-chain data may represent a data set that includes disparate and unstructured on-chain transaction data for various transactions executed within various DEXs.

In some implementations, the on-chain data collected may not be clean and human-readable data. In aspects, data collection manager 140 may be configured to normalize on-chain transaction data collected from the blockchain by applying normalization rules. In aspects, the normalization rules that may be applied to the on-chain data during collection may be DEX specific, as each of different DEX protocols may handle the different characteristics of tokens differently. For example, a first token may have characteristics such as a token symbol, a total supply, and in some cases a number of decimal places that should be considered for each of the different tokens. What's more, address token balances or swapped amounts are typically managed without decimals by smart contracts. For example, for a token swap involving one of a first token, whose number of decimal places to be considered is set to 18, a swap function may output 1000000000000000000 as the swapped amount. In this case, to normalize the swap amount across different tokens and DEXs, a rule may be applied to divide the swap amount as provided by the swap function by the number of decimals to be considered for the token, as configured for the token. In this manner, the normalized amount of the first token that is swapped may be expressed in the smallest unit available for the first token.

As has been noted repeatedly herein, different DEXs may have different protocol implementations. In particular, different DEXs may structure associated liquidity pools differently. For example, liquidity pools characteristics, such as rebalancing weight, multi-asset pools, matching, etc., may be implemented differently in different DEXs. Server 110 may be configured to apply a common model to the data collected from different DEXs in order to align the different implementations into a single standardized structure from which standardize market data may be distributed off-chain.

Data processing engine 150 may be configured to process the collected on-chain transaction data and to apply a DEX-specific model to the collected on-chain transaction data to extract desired market data that may be used (e.g., by standardized output generator 160) to generate and provide standard formatted market data. The standard formatted market data may represent market data that is standardized across the various DEXs. As noted herein elsewhere also, the DEX-specific models for the various DEXs may be a set of rules or behaviors that may define how the various DEX protocols work or operate to implement the various DEXs. These rules or behaviors may be obtained from analysis of the available data, from smart contracts implementing the DEXs, or from any other source that may provide details or information on how DEX protocols may be implemented. In this manner, the DEX-specific models for the various DEXs may represent an in-depth understanding of the various and different DEX protocols available. As noted above, this in-depth understanding of the different DEX protocols may be obtained manually, such as by analysts manually studying and mastering each of the different DEX protocols in order to generate or define the models for the various DEX protocols, or by automated analysis (e.g., machine learning analysis) of the various DEX protocols. As noted herein, the standard formatted market data may represent market data that is standardized across the various DEXs.

In aspects, data processing engine 150 may be configured to identify and generate live market data. For example, in aspects, live market data may include a current price for an asset (e.g., with respect to another asset in an asset pair), current trading volume, etc. In aspects, the live market data provided by data processing engine 150 may be DEX specific, or may be across a set of DEXs. For example, a current asset price provided may be specific to a DEX. In another example, current asset price provided for each DEX of a set of DEXs may be aggregated (e.g., averaged or otherwise combined) to provide a current asset price for an asset that is applicable to all DEXs in the set of DEXs. Data processing engine 150 may identify and generate live market data by analyzing the collected blocks to determine whether the block corresponds to a real block or not. For example, as noted above, server 110 may be or may be part of a node that is configured to collect live chain blocks within the blockchain network of the various DEXs. Typically, because of the nature of blockchains, a lag may exist in which, even when a block has been validated by several nodes, the block might change up to several chain blocks later. Because of this, a collected live block may not be a finalized block. Data processing engine 150 may be configured to identify that a parameter in the processed live block indicates that the block is a real block, and in this manner may collect on-chain transaction data even before the associated block is settled to the chain. In some aspects, live blocks associated with a transaction may be analyzed as the consensus for the block is being built. Data processing engine 150 may determine that consensus for the block has exceeded a consensus threshold, and at this point data processing engine 150 may extract market data from the block and present it as live market data in accordance with embodiments. The functionality of data processing engine 150 enables a system implemented in accordance with aspects of the present disclosure to overcome the blockchain lag, and to also overcome the issue that is caused by the fact that transactions are settled on the blockchain and so a block associated with a transaction is not finalized, an thus available as a real block on the chain, until the block is validated and consensus is built within the blockchain network.

What follows is a description of specific examples of collection and processing of on-chain and live transaction data for various specific DEX protocols in order to extract desired market data for the various transaction within the various DEXs that may be used (e.g., by standardized output generator 160) to generate and provide standard formatted market data. In a sense, the following non-limiting specific examples related to the rules and behaviors that are identified for various and/or different DEXs and that may be used as a model to extract relevant market data from blockchain data. The result of this is functionality that allows a system to provide a single endpoint that may be configured to provide market data for assets of various disparate DEXs (and in some cases CEXs).

From a general perspective, the overall approach that in some implementations may be applicable across all DEXs from which on-chain and live blockchain data is collected may include processing the collected data to identify and/or index the protocol functions enabling the various transactions within a DEX. These protocol functions may include one or more of: swap, mint, and burn protocol functions. Mint and burn functions may be associated with transactions that may correspond to token additions and removals, respectively, to and from liquidity pools. Swap functions may be configured to perform swap transactions that enable a user to execute a swap between a first token and a second token, in accordance with the protocol. For example, a user may execute a swap transaction between two tokens using DEX 175 by interacting with the appropriate smart contract managing the swap function for DEX 175. The swap transaction may be executed and settled directly on blockchain 170. The implementation of the different protocol functions may vary across different DEX protocols. For example, some DEX protocols may allow users to trade an ERC-20 token with a Tokenized Pool or metapools, while other DEX protocols may not. It is these differences between smart contracts implementing different DEXs that have presented an obstacle to providing users with consistent data that covers the entirety of DEXs trades activity in a standardized manner and which embodiments of the present disclosure solves.

As noted above, executing a swap transaction may include one or more trade events that enable a user to swap between a first token and a second token. For example, a user may execute a swap between two tokens using DEX 175 by interacting with the appropriate smart contract managing the swap function for DEX 175. The swap function may be executed in accordance with DEX 175's protocol, and the swap transaction may be settled directly on blockchain 170.

It should be appreciated that the discussion of the specific examples that follows is provided by way of example and is not intended to be limiting in any way. Indeed, in some embodiments, collection and processing of on-chain transaction data for a targeted DEX protocol may be implemented using an approach that may include analysis of the targeted DEX protocol to determine and obtain the technical implementation details and to implement a collection and processing model enabling a system (e.g., system 100) to collect and process the on-chain and live transaction data for a targeted DEX protocol.

In one example, a DEX protocol may be implemented to include a basic constant product market maker model, liquidity provided by users to liquidity pools with two tokens, and liquidity available for prices from 0 up to no limit. An example of such a DEX protocol may include the Uniswap V2 protocol. In some implementations, this particular DEX protocol may focus on ERC-20 tokens built on the Ethereum blockchain, and may enable direct, peer-to-peer transactions through automated smart contracts. This DEX protocol may allow any user to create token pairs for trading. In aspects, data processing engine 150 may identify (e.g., based on a model generated on previous analysis) how this DEX protocol may implement a swap function. In particular, data processing engine 150 may process a transaction block for this DEX protocol and may identify a swap transaction based on the following implementation details of this DEX protocol. For example, a swap transaction executed within this DEX protocol may include swapping between tokens of a token pair. A trader may interact with one or more smart contracts implementing this DEX protocol and may attempt to swap a first token for a second token. A swap function may be executed in accordance with the DEX protocol, and the swap transaction may be settled directly on the Ethereum blockchain.

In some cases, a swap transaction within this DEX protocol may include more than one swap event. For example, when the trader attempts the swap transaction between the first token and the second token by interacting with the smart contract implementing the DEX protocol, a first check is made to determine whether a first token/second token liquidity pool exists. If a first token/second token liquidity pool exists, then the swap transaction may be executed directly using the existing first token/second token liquidity pool. If, however, a first token/second token liquidity pool does not exist, the user may still be allowed to execute the swap transaction from the first token to the second token in a single swap transaction, even though a smart contract might not exist configuring a liquidity pool for the first token/second token asset pair, by dividing the swap transaction into multiple swap events, where each swap event is a swap between tokens for which a liquidity pool exists. For example, liquidity pools for a first token/third token pair and for a third token/second token pair may exist in this DEX. In this case, in order to execute the swap transaction between the first token and the second token, a swap between the first token and the third token may be executed against the first token/third token liquidity pool adding the first token from the user's first token wallet to the first token/third token liquidity pool, and then another swap between the third token and the second token may be executed against the third token/second token liquidity pool removing the second token from the third token/second token liquidity pool to the user's second token wallet address, thereby creating a path to swap between the first token and the second token. In this manner, a path is created combining multiple swap events to execute the original swap transaction.

In aspects, data processing engine 150 may identify how the DEX protocol of the current example may determine prices for the various tokens. In particular, data processing engine 150 may process a transaction block for this DEX protocol and may identify a transaction data related to token prices based on the following implementation details of this DEX protocol. In accordance with this DEX protocol, every liquidity pool implemented may follow the constant product model, expressed by the equation $x*y=k$, with x being the quantity of a first token of the liquidity pool, y being the quantity of a second token of liquidity pool, and k being the constant product of the x and y. In this implementation, k controls price movements between the first and second tokens of the liquidity pool. For this DEX protocol, exchange rates or prices may be determined according to the token balances on a liquidity pool based on the constant product model equation. As such, data processing engine 150 may identify an exchange rate or price for this DEX protocol based on the above described behavior.

In aspects, data processing engine 150 may be configured to extract market data (e.g., trade transaction data) directly extracted from transaction data associated with swap events of the DEX protocol of the current example. For example, as noted above, in this DEX protocol, liquidity pools always include two tokens, and may have a trading fee associated with swap transactions. Based on this, data processing engine 150 may know that there cannot be two liquidity pools for the same token pair. In addition, each liquidity pool in this DEX protocol may be identified by a unique pool address. From a practical standpoint, a liquidity pool address may be a unique string of characters that identifies a liquidity pool on a DEX and may be considered as the equivalent of a token pair on that DEX. For example, the liquidity pool address of the USDC-USDT liquidity pool on the Uniswap V2 protocol is currently 0x3041cbd36888becc7bbcbc0045e3b1f144466f5f. However, in this DEX protocol, all the liquidity pools may be related to the same smart contract. This smart contract may be a combination of events or protocol functions that rule, govern, or manage the functionality of this DEX protocol and define what may and may not be done within this DEX protocol. Examples of functionality may include a swap function allowing trading between two tokens, a mint function allowing addition of liquidity to the liquidity pool, and/or a burn function allowing removal of tokens from the liquidity pool.

In another example, a DEX protocol may be implemented to include a basic constant product market maker model within prices ranges, a liquidity model that includes concentrating liquidity pools into price ranges (e.g., lower price, upper price, etc.), and liquidity pools with only two tokens but allowing multiple liquidity pools (e.g., fee tier-based) for a same token pair. An example of such a DEX protocol may include the Uniswap V3 protocol. In aspects, data processing engine 150 may process transaction data for this DEX protocol based on the following implementation details of this DEX protocol. In particular, this DEX protocol implements liquidity in terms of liquidity pools rather than token pairs. For example, rather than implementing a single liquidity pool for a token pair, this DEX protocol allows multiple liquidity pools for the same token pair, but each liquidity pool may be associated with a different transaction fee. This particular implementation creates a challenge when attempting to standardize market data for a token, as the transaction data for a same token pair may be spread over transactions associated with different liquidity pools. For example, a first token/second token liquidity pool may be implemented for transactions with a 0.05% fee, while another first token/second token liquidity pool may be implemented for transactions with a 0.3% fee. In aspects, data processing engine 150 may be configured to identify and aggregate or combine transactions executed against the 0.05% fee liquidity pool and transactions executed against the 0.3% fee liquidity pool to obtain transaction data for the first token/second token. In this manner, data processing engine 150 may obtain transaction data for the first token/second token that combines trades registered for all liquidity pools associated with the first token/second token pair.

In yet another example, a DEX protocol may be implemented to include a sum and product market maker model for stablecoin swaps, liquidity pools for more than two coins, different types of liquidity pools as meta pools, and one smart contract per liquidity pool. An example of such a DEX protocol may include the Curve protocol. In aspects, data processing engine 150 may process transaction data for this DEX protocol based on the following implementation details of this DEX protocol. In particular, this DEX protocol implements liquidity using liquidity pools configured for tokens that behave similarly to stablecoins, or tokens that are wrapped versions of like assets, sometimes also called mirrored assets. The use of stablecoins liquidity pools means that liquidity provided by the liquidity pools of this DEX protocol may be swapped with a very low slippage risk. In addition, due to DeFi composability, the liquidity of this DEX protocol may be used in other lending protocols.

In aspects, data processing engine 150 may process transaction data for this DEX protocol based on an understanding that this DEX protocol is implemented using an AMM mechanism, but the main objective of this DEX protocol is to maintain prices between two tokens as close as possible to 1, the ideal price for similarly priced assets (e.g., in a 1:1 ratio). The stability provided by this DEX protocol may be obtained based on a combination of a constant product approach and sum AMM, as well as the concept of the Stableswap invariant. However, although all liquidity pools of this DEX protocol may implement the StableSwap invariant, these liquidity pools may be implemented differently. In implementations, the three main liquidity pools types that may be implemented in this DEX protocol may include 1) plain liquidity pools that correspond to the simplest form of liquidity pools as an implementation of the StableSwap invariant and may contain two or more tokens, 2) lending liquidity pools that include lending functionality where two or more wrapped tokens may be paired against one another while the underlying token may be lent out on some other lending protocol, and 3) metapools, which may include liquidity pools that allow for the exchange of one or more tokens with tokens of one or more underlying other liquidity pools. In addition, even though liquidity pools in a Curve DEX may be created by anyone, only liquidity pools deployed by the Curve organization are the official Curve liquidity pools that may be presented in Curve's user interface (with some exceptions such as liquidity pools verified by the Curve organization).

In aspects, data processing engine 150 may process transaction data for this DEX protocol based on an understanding that this DEX protocol may implement a one pool-one smart contract approach. In particular, in this DEX protocol, there may be a single smart contract for each liquidity pool. In this DEX protocol, all smart contracts may be implemented based on common liquidity pool templates, while in other DEX protocols, all liquidity pools may share the same logic and thus the same smart contract. As such, in aspects, system 100 may be configured to connect (e.g., using data collection manager 140) to each smart contract implementing the various liquidity pools in this DEX protocol separately, and may collect and process swap events from each of the various liquidity pools. As noted above, data processing engine 150 may be configured to process the collected and normalized data for all token swaps that have been registered in all the available liquidity pools for this DEX protocol to identify and extract market data, and to standardize the market data into a standard format to be provided as standard formatted market data.

In still another example, a DEX protocol may be implemented to include an AMM approach, liquidity pools that support up to 8 tokens in each liquidity pool, shared liquidity pools, private liquidity pools, and smart liquidity pools, and a single-asset exposure liquidity pool approach. An example of such a DEX protocol may include the Balancer V1 protocol. In aspects, data processing engine 150 may process transaction data for this DEX protocol based on the following implementation details of this DEX protocol. In particular, liquidity pools in this DEX protocol implements support a user providing only one token in a pool (e.g., single-asset exposure), rather than a user having to add liquidity to a pool by providing two tokens (e.g., in a token pair) to a liquidity pool. In implementations, this DEX protocol may allow liquidity pools that consist of two to eight tokens, where each token may have a different arbitrary share of the liquidity pool (also called weight). The weight of a token within a liquidity pool may range between 2% and 98%. In aspects, data processing engine 150 may be configured to consider the weight of a token within a liquidity pool in a transaction, as the weight of a token may impact the way price is determined. For example, this DEX protocol may take into account weights and may transform the basic constant product 50/50 AMM (x*y=k), to a constant product AMM in which prices may be totally dependent on predetermined, albeit not necessarily equally distributed, token weights calculated based on the following equation: $\Pi_k r_k^{w_k}$, where $w_k$ represents the weight of an asset reserve $r_k$, and which may also be interpreted as the quantity of token k in a liquidity pool. As such, it is understood that with fixed weights and the ability for liquidity providers to have single-asset exposure, market efficiency may only be achieved thanks to arbitrageurs that may profit of price discrepancies between the liquidity pools.

In aspects, data processing engine 150 may process transaction data for this DEX protocol based on an understanding that in this DEX protocol, trade transactions may be routed among multiple liquidity pools using a smart order routing (SOR) technique that may source liquidity from multiple liquidity pools such that the best available price between to tokens may be offered to a trader.

In general terms, and for DEX protocols that may not implement liquidity pools based on token pairs, but allow swapping two tokens from pools that are composed of two or more tokens, data processing engine 150 may be configured to identify swap events based on an understanding that the notion of a base token and quote token may not be applicable to these liquidity pools. For example, a trader may swap (e.g., may sell) a first token for (e.g., buying) a second token of a different type. In this case, the token pair extracted from the liquidity pool may be a first token-second token pair. In another case, a trader may swap (e.g., may sell) the second token for (e.g., buying) the first token and in this case, the token pair extracted from the liquidity pool may be a second token-first token pair. In this example, with these liquidity pools that are not implemented based on token pairs, the two pairs may be considered as a single pair, as the two different extracted pairs are composed of the same token assets. However, in order to provide standardized data, data processing engine 150 may be configured to identify token pairs associated with liquidity pools. For example, in aspects, data processing engine 150 may be configured to process transaction data associated with a swap event involving a first token and a second token against a liquidity pool and may identify a base token and a quote token from the transaction data. For example, the transaction data may indicate that a first token address may be 0xdac17f958d2ee523a2206206994597c13d831ec7, and the second token address may be 0xc02aaa39b223fe8d0a0e5c4f27ead9083c756cc2. In that case, data processing engine 150 may determine that the liquidity pool against which the trade transaction was executed may include a second token-first token pair since alphabetically, 0xc occurs before 0xd. Therefore, data processing engine 150 may determine that the transaction trade involved a trade where the second token is the base token and the first token is the quote token, namely a second token-first token swap. In aspects, data processing engine 150 may be configured to apply the above pair generation technique to liquidity pool with more than two tokens in order to identify all pair possibilities that may be extracted from a liquidity pool.

In aspects, data processing engine 150 may be configured to combine first token-second token pairs and second token-first token pairs for a particular liquidity pool. In this case, the price and amount associated with a transaction for these pairs may also be aligned. For example, where first token-second token pairs and second token-first token pairs may be combined into first token-second token pairs, the price and amount for a transaction involving a second token-first token pairs may be inversed by data processing engine 150. In this case, the amount of the second token-first token pair transaction may be inverted by applying the following: newAmount=previousAmount*previousPrice, and the price of the second token-first token pair transaction may be inverted by applying the following: newPrice=1/previousPrice.

In another example, DEX aggregators may be used to expose functionality of one or more DEXs. For example, 1 inch Aggregator is a DEX aggregator that operates on the Ethereum blockchain. DEX aggregators may implement a DEX aggregator protocol that may allow a trader to find and execute trade transactions by identifying the most efficient transactions across DEXs (e.g., the transaction available at the best price). In some implementations, a single swap transaction may be split over one or several DEX liquidity pools. The final swap event may be executed using the DES aggregator protocols, but may be composed of a path of other swap events that may use liquidity from other DEX protocols.

Figure 2A:
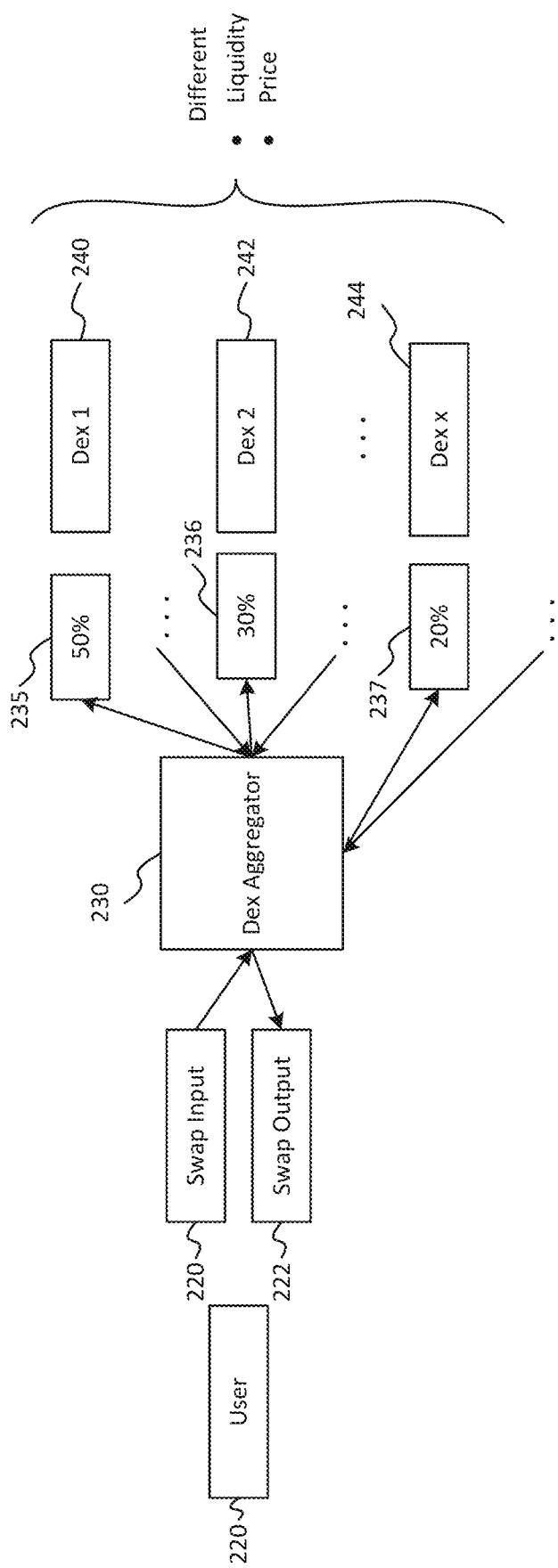
FIG. 2A illustrates an example of a DEX aggregator.

FIG. 2A illustrates an example of a DEX aggregator. As shown, user 210 may initiate a swap transaction to swap first token 220 for second token 222. The swap transaction may leverage the functionality of DEX aggregator protocol 230. DEX aggregator protocol 230 may find and execute individual swap transactions (herein referred to as swap events) against different liquidity pools, in accordance with a determination of a best transaction. For example, DEX aggregator protocol 230 may identify that dividing the swap transaction into individual swap events 235, 236, and 237 may yield the best price for the swap transaction. However, each of swap events 235, 236, and 237 may be executed against different liquidity pools (in different DEX protocols) and with different shares of the total amount of first token 220 to the swapped. For example, DEX aggregator protocol 230 may determine that the best price may be obtained if 50% of the transaction amount is swapped against the liquidity pool available in first DEX 240, 30% of the transaction amount is swapped against the liquidity pool available in second DEX 242, and 20% of the transaction amount is swapped against the liquidity pool available in first DEX 244. Notably, each of DEXs 240-244 may be implemented using a different DEX protocol. In this example, DEX aggregator protocol 230 may execute each of swap events 235, 236, and 237, resulting in swapping 100% of first token 220. In this manner, the swap transaction initiated by user 210 may be composed of individual swap events 235, 236, and 237.

With reference back to FIG. 1, data processing engine 150 may be configured to identify transactions executed using the DEX aggregator protocol. In particular, it is noted that the individual swap events that make up the swap transaction share a single and same transaction hash, as each swap event is part of the same chain block and transaction on the blockchain in which the transaction is settled. As used here, a transaction hash may be a unique string of characters assigned to every transaction that is verified and added to a blockchain. On DEXs, multiple transaction events may have the same transaction hash if they are part of the same transaction and thus the same block.

Figure 2B:
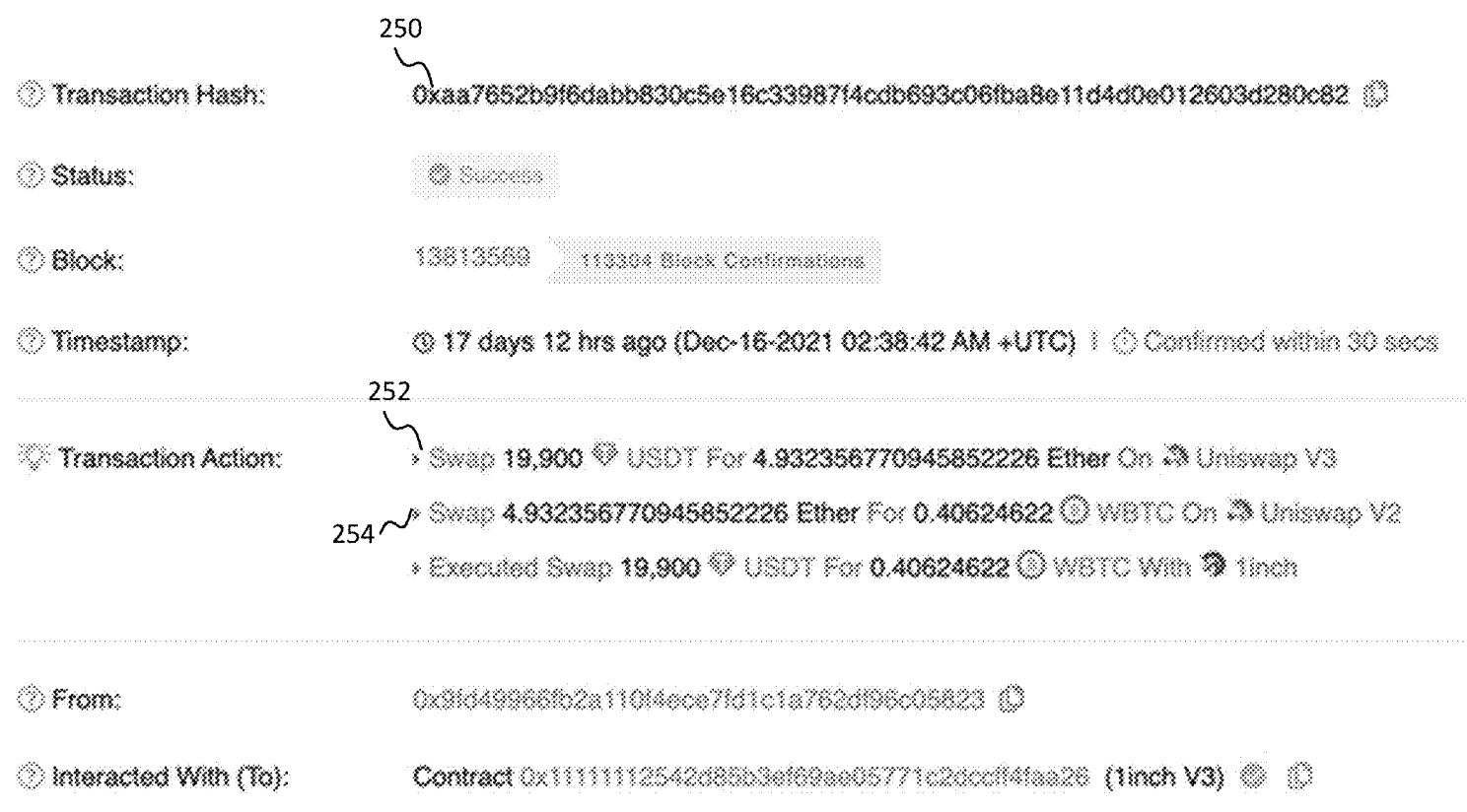

In aspects, data processing engine 150 may be configured to identify swap transactions executed using the DEX aggregator protocol by applying the following concept: a swap event comes before a swap transaction that comes before a settlement-delivery of the asset. Swap events and swap transactions are closely related, and settlement is made on-chain. Based on the foregoing, data processing engine 150 may be configured to identify each swap event associated with a single swap transaction by a single transaction hash. A swap event may be considered an operation between a sender and a receiver, that concerns a pair of tokens, and that implies a trading amount at a given price. As an example, FIG. 2B shows a screenshot of a swap transaction executed using a DEX aggregator protocol to illustrate exemplary types of information that may be extracted or identified by data processing engine 150. In particular, as shown, the 1 inch aggregator protocol is used to execute a USDT/WBTC swap transaction. The illustrated swap transaction uses liquidity available for the USDT/WBTC pair in a Uniswap V2 DEX and a Uniswap V3 DEX. As shown, the USDT/WBTC swap transaction is executed by the 1 inch aggregator protocol by executing two swap events (e.g., swap event 252 and swap event 254), which are recorded at the exact same timestamp. In particular, the first swap event 252 consists of a USDT-WETH swap on Uniswap's V3 associated liquidity pool (registered as a trade on Uniswap V3 tick-trades data, and identified by data processing engine 150 based on the transaction hash 250). The second swap event 254 consists of a WETH-WBTC swap on Uniswap's V2 associated liquidity pool (registered as a trade on Uniswap V2 tick-trades data, and identified by data processing engine 150 based on the transaction hash 250).

With reference back to FIG. 1, output generator 160 may be configured to provide standard formatted market data representing the on-chain data to users via various off-chain distribution channels. As noted above, data processing engine 150 may be configured to identify and extract market data from on-chain and live blockchain data associated with transactions executed within disparate DEX protocols. In aspects, output generator 160 may be configured to structure the market data extracted from the on-chain data for token swap transactions into a standard structure, such as a traditional trade format including a trade amount, a trade price, a trade direction (e.g., buy or sell), a trade ID, and/or a trade timestamp. In aspects, the standard trade format may include a traditional that may be used for providing market data for assets hosted in a CEX. Indeed, in some aspects, the market data for assets hosted in DEXs may be presented together with market data for assets hosted in a CEX. In this manner, the functionality of output generator 160 may allow a single endpoint for providing market data for assets of CEXs and/or DEXs within a same environment. For example, output generator 160 may organize and/or structure the market data identified and/or extracted by data processing engine 150 into a standard format that may be provided to users.

In accordance with embodiments, output generator 160 may be configured to provide the standardized market data to users via one or more off-chain distribution channels. In aspects, as noted above, an off-chain distribution channel for distributing the standardized market data may include GUI 182 (e.g., for displaying the standardized market data). In aspects, a user may specify configurations on how the market data is to be presented on GUI 182, including which DEXs market data is to be displayed for, individual assets market data, and in some cases even which CEXs market data is to be displayed for. In some aspects, an off-chain distribution channel for distributing the standardized market data may include API 180 configured to allow users to request, via functions provided in API 180, the market data. API 180 may define various functions for requesting data, which data is requested, and how the data is to be delivered to the user. In this manner, API 180 may provide a user an entry point into all the functionality of system 100 as described herein. In an aspect, API 180 may provide functionality to provide (e.g., on an as-requested basis or a streaming basis) real-time or near-real-time trading data to an external GUI for presentation to a user (e.g., as trade tick data). In aspects, API 180 may also provide functionality to drive other functionality (e.g., balancing of stablecoins associated with asset backing, etc.).

In aspects, the standardized market data generated by output generator 160 may include tick-level trade data, open, high, low, close, volume (OHLCV) candlestick data, and/or volume weighted average (VWAP) data.

In aspects, output generator 160 may be configured to generate tick-level trade data from the collected on-chain market data on every executed transaction on one or more DEXs. In some aspects, output generator 160 may aggregate the tick-level data for the one or more DEXs with market data for transactions executed within one or more CEXs. In this manner, the tick-level data generate by output generator 160 may include a single endpoint for providing market data to users. The tick tick-level trade data for a transaction may include a trade price, a trade direction (e.g., buy or sell), and a trade volume or amount. This data is available for all traded pairs on DEXs and CEXs. With respect to DEXs, output generator 160 may be configured to also provide a trade ID. In aspects, output generator 160 may generate a custom trade ID that represents % a unique trade identifier and is generated based on the transaction hash, the liquidity pool address against which the transaction was executed, and a log index.

As noted above, a transaction hash may be a unique string of characters assigned to every transaction that is verified and added to a blockchain. On DEXs, multiple transaction events may have the same transaction hash, such as in DEX implementations where two swapped tokens may not be paired directly, as described above. In these cases, the swap transaction may be divided into multiple swap events that when combined result in the swapping of the desired tokens.

Each of the individual swap events is considered a trade event and each of them shares the same transaction hash, albeit a different log index.

In a blockchain architecture, a log index may be used to index log into which each block on a blockchain may be divided. Each log record may include the swap transactions. In this manner, a log index may be used to describe an event within a smart contract, such as a token transfer. The functionality of output generator 160 to combine the transaction hash and the log index of a trade event is thus unique to each log and allows to differentiate trade events that are part of the same transaction.

A liquidity pool address may be a unique string of characters which identifies a liquidity pool on DEXs. As described above, some liquidity pools may be composed of two or more tokens. The functionality of output generator 160 to combine a liquidity pool address against which a trade was executed with the transaction hash and the log index allows a trade ID to distinguish between trades of tokens against a liquidity pool that may have more than two base tokens.

Figure 3A:
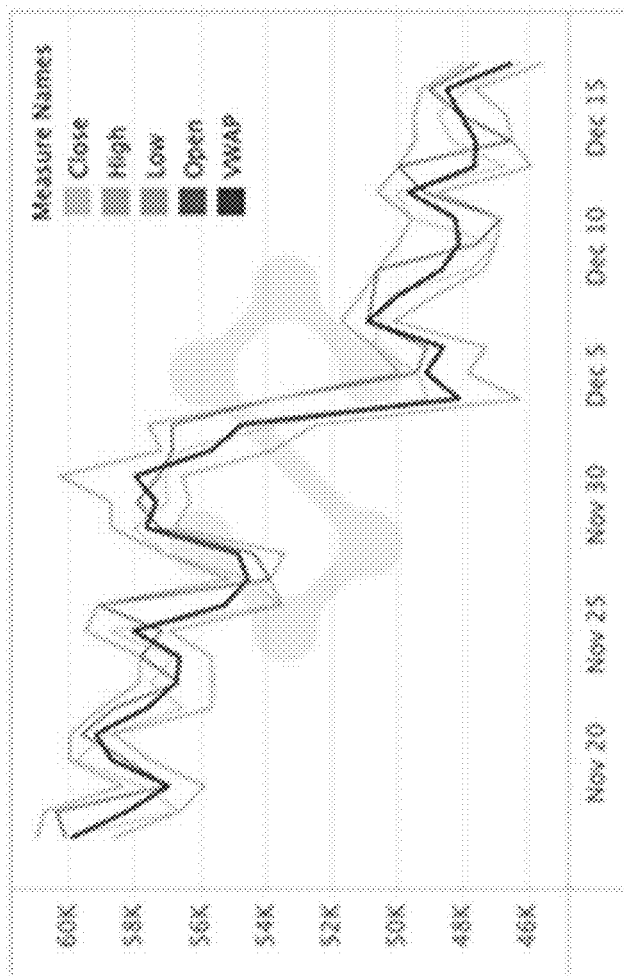
FIG. 3A illustrates an example of open, high, low, close, volume (OHLCV) data provided for a token pair on a DEX in accordance with aspects of the present disclosure.

In aspects, output generator 160 may be configured to generate OHLCV candlestick data from the collected on-chain market data on every executed transaction on one or more DEXs. In aspects, the OHLCV candlestick data may be derived by output generator 160 from tick-trades data, and may be aggregated based on a requested parameter (e.g., by timestamp). In aspects, output generator 160 may provide the OHLCV candlestick data in granularities ranging from 1 second to 1 day. Output generator 160 may combine the OHLCV candlestick data for all DEXs as well as for all CEXs in a format standardized across all exchanges. In this manner, the OHLCV candlestick data may be made available via a single endpoint. FIG. 3A illustrates an example of OHLCV data provided for a token pair on a DEX in accordance with aspects of the present disclosure.

Figure 3B:
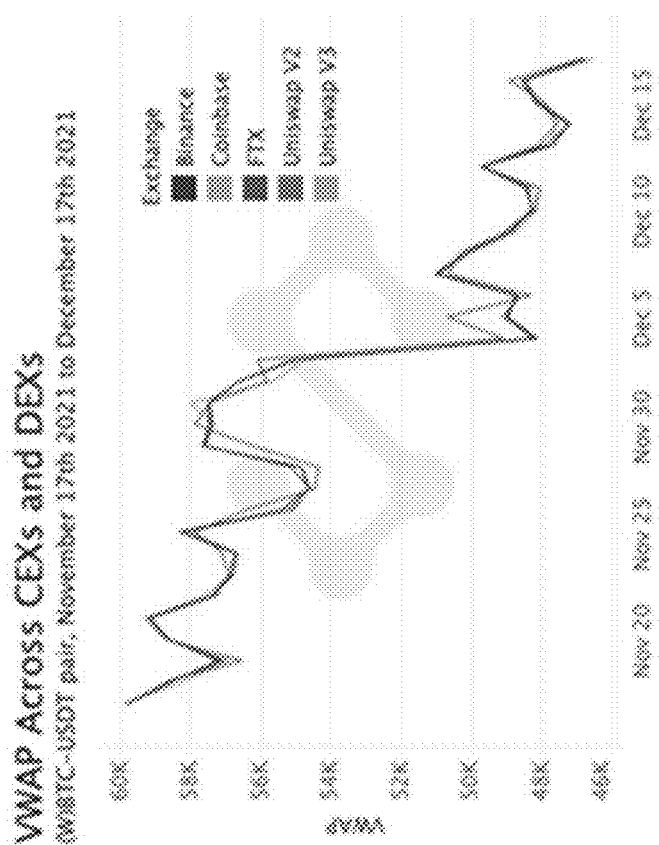
FIG. 3B illustrates an example of volume weighted average (VWAP) data provided for a token pair across multiple DEXs and CEXs in accordance with aspects of the present disclosure.

In aspects, output generator 160 may be configured to generate VWAP data from the collected on-chain market data on every executed transaction on one or more DEXs. In aspects, the VWAP data may be derived by output generator 160 from tick-trades data. For example, output generator 160 may calculate the VWAP data for a given period by multiplying each trade price for transactions occurring during the period by the respective trades amount. The product for all transactions is then added together, and the sum is divided by the total volume of all transactions during the specified period. This may be performed for each instrument (e.g., for each exchange and asset pair combination). The VWAP data provided by output generator 160 may be aggregated based on a requested parameter (e.g., by timestamp). In aspects, output generator 160 may provide the VWAP data in granularities ranging from 1 second to 1 day. Output generator 160 may combine the VWAP data for all DEXs as well as for all CEXs in a format standardized across all exchanges. In this manner, the VWAP data may be made available via a single endpoint. FIG. 3B illustrates an example of VWAP data provided for a token pair across multiple DEXs and CEXs in accordance with aspects of the present disclosure.

Figure 4:
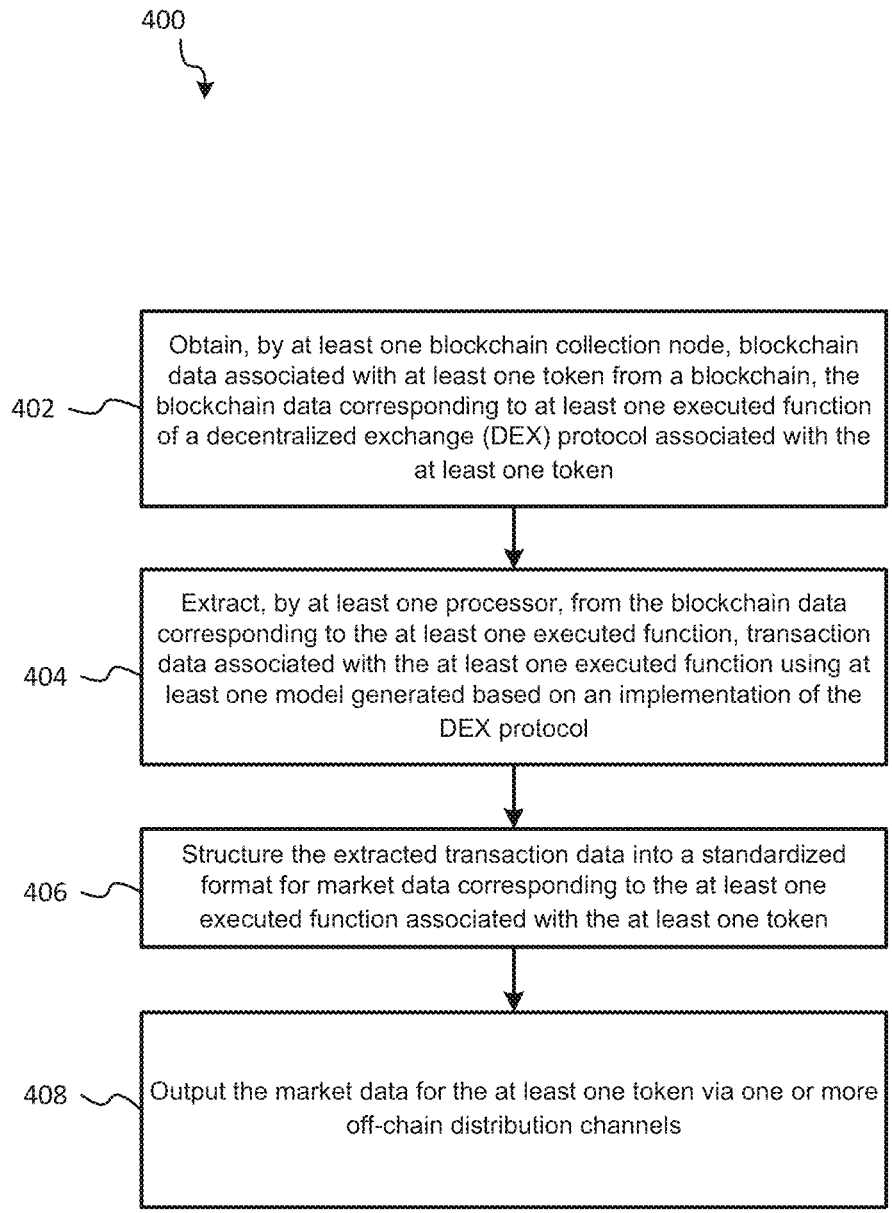
FIG. 4 shows a high level flow diagram of operation of a system configured in accordance with aspects of the present disclosure for providing mechanisms for generating live market data for decentralized systems from transaction data extracted from a blockchain in accordance with embodiments of the present disclosure.

Referring to FIG. 4, a flow diagram illustrating an example of a method for generating live market data for decentralized systems from transaction data extracted from a blockchain according to one or more aspects is shown as a method 400. In aspects, the operations of the method 400 may be stored as instructions that, when executed by one or more processors, cause the one or more processors to perform the operations of the method 400. In aspects, the method 40 may be performed by a server, such as server 110 of system 100 as illustrated in FIG. 1.

The method 400 includes obtaining, by at least one blockchain collection node, blockchain data associated with at least one token from a blockchain. In aspects, the blockchain data may correspond to at least one executed function of a DEX protocol associated with the at least one token. For example, blockchain data associated with at least one token from a blockchain may be obtained by a data collection manager (e.g., by a data collection manager such as data collection manager 140 of FIG. 1). In aspects, the data collection manager may perform operations to obtain blockchain data associated with at least one token from a blockchain according to operations and functionality as described above with reference to data collection manager 140 and as illustrated in FIGS. 1-3B.

The method 400 includes extracting, from the blockchain data corresponding to the at least one executed function, transaction data associated with the at least one executed function using at least one model generated based on an implementation of the DEX protocol. In aspects, functionality of a data processing engine (e.g., data processing engine 150) may be used to extract transaction data associated with the at least one executed function using at least one model generated based on an implementation of the DEX protocol from the blockchain data corresponding to the at least one executed function. In aspects, the data processing engine may perform operations to extract transaction data associated with the at least one executed function using at least one model generated based on an implementation of the DEX protocol from the blockchain data corresponding to the at least one executed function according to operations and functionality as described above with reference to data processing engine 150 and as illustrated in FIGS. 1-3B.

The method 400 includes structuring the extracted transaction data into a standardized format for market data corresponding to the at least one executed function associated with the at least one token. In aspects, functionality of a data processing engine (e.g., data processing engine 150) may be used to structure the extracted transaction data into a standardized format for market data corresponding to the at least one executed function associated with the at least one token. In aspects, the data processing engine may perform operations to structure the extracted transaction data into a standardized format for market data corresponding to the at least one executed function associated with the at least one token according to operations and functionality as described above with reference to data processing engine 150 and as illustrated in FIGS. 1-3B.

The method 400 includes outputting the market data for the at least one token via one or more off-chain distribution channels. In aspects, functionality of a standardized output generator (e.g., standardized output generator 160) may be used to output the market data for the at least one token via one or more off-chain distribution channels. In aspects, the standardized output generator may perform operations to output the market data for the at least one token via one or more off-chain distribution channels according to operations and functionality as described above with reference to standardized output generator 160 and as illustrated in FIGS. 1-3B.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of generating live market data for decentralized systems from transaction data extracted from a blockchain, comprising:
   obtaining, by at least one processor of a server, blockchain data associated with at least one token from a blockchain network, the blockchain data corresponding to at least one executed function of a decentralized exchange (DEX) protocol associated with the at least one token, wherein the DEX protocol comprises one or more smart contracts configured to settle transactions involving the at least one executed function of the DEX protocol against liquidity pools of a DEX;
   extracting, by the at least one processor, from the blockchain data corresponding to the at least one executed function, transaction data associated with the at least one executed function using at least one model automatically generated based on an implementation of the DEX protocol;
   identifying and generating, by the at least one processor, live market data for the at least one token based on the extracted transaction data, wherein the generating comprising:
   structuring, by the at least one processor, the extracted transaction data into a standardized format for live market data corresponding to the at least one executed function associated with the at least one token; and
   outputting, the at least one processor, the live market data for the at least one token to one or more off-chain distribution channels, wherein the one or more off-chain distribution channels comprise at least one graphical user interface that provides functionality executing a transaction with respect to the at least one token via the one or more smart contracts of the DEX protocol.

2. The method of claim 1, wherein the at least one executed function includes one or more of:
a token swapping function;
a token minting function; and
a token burning function.

3. The method of claim 2, wherein the at least one executed function includes the token swapping function including executing a swap a quantity of a first token for a quantity of a second token, the second token different from the first token.

4. The method of claim 3, wherein the transaction data associated with the swap of the quantity of the first token for the quantity of the second token includes one or ore more of:
a price expressed in terms of the first token;
a volume of the swap in terms of the first token;
a direction of the swap indicating whether the swap is a sell or a buy;
a trade identification (ID); and
a timestamp associated with the swap.

5. The method of claim 4, wherein the trade ID is generated based on one or more of:
a transaction hash associated with the blockchain data, the transaction hash associated with the swap;
an address of a liquidity pool associated with the at least one token; and
a log index for each trade event associated with the swap, wherein the swap of the quantity of the first token for the quantity of the second token is a multi-step swap and each trade event indicates a step of the multi-step swap, wherein at each step one token is swapped for a different token.

6. The method of claim 1, wherein the blockchain data associated with the at least one token includes one or more blocks that have not been finalized to the blockchain.

7. The method of claim 1, wherein the one or more off-chain distribution channels include one or more of:
an advanced programming interface that includes one or more functions for exposing the live market data for the at least one token; and
a graphical user interface for displaying the live market data for the at least one token.

8. The method of claim 1, wherein the at least one model generated based on an implementation of the DEX protocol includes a model generated based on at least one smart contract implementing the DEX protocol.

9. The method of claim 1, wherein the implementation of the DEX protocol is different from an implementation of another DEX protocol.

10. The method of claim 1, wherein the at least one token includes a first token and a second token, the first token and the second token having a same technical implementation following a same technical standard.

11. A system for generating live market data for at least one decentralized exchange (DEX) from transaction data extracted from a blockchain, comprising:
a server comprising:
a memory;
at least one processor configured to:
collect blockchain data associated with one or more tokens from one or more blockchain networks, the blockchain data corresponding to one or more executed protocol functions of a DEX protocol associated with the one or more tokens, wherein the DEX protocol comprises one or more smart contracts configured to settle transactions involving the one or more executed protocol functions of the DEX protocol against liquidity pools of a DEX;
a data processing engine executable by the at least one processor and configured to:
extract, from the blockchain data corresponding to the one or more executed protocol functions, transaction data associated with the one or more executed protocol functions using one or more models automatically generated based on an implementation of the DEX protocol; and
identify and generate live market data for the one or more tokens based on the extracted transaction data, wherein the generating comprises:
structure the extracted transaction data into a standardized format for live market data corresponding to the one or more executed protocol functions associated with the one or more tokens; and
an output generator executable by the at least one processor and configured to:
output the live market data for the one or more tokens to one or more off-chain distribution channels, wherein the one or more off-chain distribution channels comprise at least one graphical user interface that provides functionality executing a transaction with respect to the one or more tokens via the one or more smart contracts of the DEX protocol.

12. The system of claim 11, wherein the one or more executed protocol functions include one or more of:
a token swapping function including executing a swap of a quantity of a first token for a quantity of a second token, the second token different from the first token;
a token minting function adding liquidity to at least one liquidity pool associated with the one or more tokens; and
a token burning function removing liquidity from the at least one liquidity pool associated with the one or more tokens.

13. The system of claim 12, wherein the first token and the second token have a same technical implementation following a same technical standard.

14. The system of claim 12, wherein the transaction data associated with the swap of the quantity of the first token for the quantity of the second token includes one or ore more of:
a price expressed in terms of the first token;
a volume of the swap in terms of the first token;
a direction of the swap indicating whether the swap is a sell or a buy;
a trade identification (ID); and
a timestamp associated with the swap.

15. The system of claim 14, wherein the trade ID is generated based on one or more of:
a transaction hash associated with the blockchain data, the transaction hash associated with the swap;
an address of a liquidity pool of the at least one liquidity pool associated with the swap of the quantity of the first token for the quantity of the second token; and
a log index for each trade event associated with the swap, wherein the swap of the quantity of the first token for the quantity of the second token is a multi-step swap and each trade event indicates a step of the multi-step swap, wherein at each step one token is swapped for a different token.

16. The system of claim 11, wherein the one or more models are generated based on at least one smart contract implementing the different protocols implementing the at least one DEX.

17. A computer-based tool for generating live market data for decentralized systems from transaction data extracted from a blockchain, the computer-based tool including non-transitory computer readable media having stored thereon computer code which, when executed by a processor, causes a computing device to perform operations comprising:
- obtaining a blockchain data associated with at least one token from a blockchain network, the blockchain data corresponding to at least one executed function of a decentralized exchange (DEX) protocol associated with the at least one token, wherein the DEX protocol comprises one or more smart contracts configured to settle transactions involving the at least one executed function of the DEX protocol against liquidity pools of a DEX;
- extracting from the blockchain data corresponding to the at least one executed function, transaction data associated with the at least one executed function using at least one automatic model generated based on an implementation of the DEX protocol;
- identifying and generating, by the processor, live market data for the at least one token based on the extracted transaction data, wherein the generating comprises:
- structuring the extracted transaction data into a standardized format for live market data corresponding to the at least one executed function associated with the at least one token; and
- outputting the live market data for the at least one token to one or more off-chain distribution channels, wherein the one or more off-chain distribution channels comprise at least one graphical user interface that provides functionality executing a transaction with respect to the at least one token via the one or more smart contracts of the DEX protocol.

18. The computer-based tool of claim 17, wherein the at least one executed function includes one or more of:
- a token swapping function including executing a swap of a quantity of a first token for a quantity of a second token, the second token different from the first token;
- a token minting function adding liquidity to at least one liquidity pool associated with the at least one token; and
- a token burning function removing liquidity from the at least one liquidity pool associated with the at least one token.

19. The computer-based tool of claim 18, wherein the transaction data associated with the swap of the quantity of the first token for the quantity of the second token includes one or ore more of:
- a price expressed in terms of the first token;
- a volume of the swap in terms of the first token;
- a direction of the swap indicating whether the swap is a sell or a buy;
- a trade identification (ID); and
- a timestamp associated with the swap.

20. The computer-based tool of claim 17, wherein the blockchain data associated with the at least one token includes one or more blocks that have not been finalized to the blockchain.

\* \* \* \* \*

UNITED STATES PATENT AND TRADEMARK OFFICE
CERTIFICATE OF CORRECTION

| | |
|---|---|
| PATENT NO. | : 11,816,732 B1 |
| APPLICATION NO. | : 18/127648 |
| DATED | : November 14, 2023 |
| INVENTOR(S) | : Anastasia Melachrinos et al. |

It is certified that error appears in the above-identified patent and that said Letters Patent is hereby corrected as shown below:

In the Claims

At Column 27, Claim number 17, Line number 7, delete "obtaining a blockchain data" and replace with --obtaining blockchain data--.

Signed and Sealed this
Twenty-third Day of January, 2024

Katherine Kelly Vidal
*Director of the United States Patent and Trademark Office*